US006670552B2

(12) United States Patent
Kuroda et al.

(10) Patent No.: US 6,670,552 B2
(45) Date of Patent: Dec. 30, 2003

(54) HOUSING AND COAXIAL CONNECTOR HAVING THE SAME

(75) Inventors: Keiji Kuroda, Osaka (JP); Hiroaki Kukita, Yokohama (JP); Kiyoshi Aramoto, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/393,760

(22) Filed: Mar. 21, 2003

(65) Prior Publication Data

US 2003/0178219 A1 Sep. 25, 2003

(30) Foreign Application Priority Data

Mar. 22, 2002 (JP) ...................................... 2002-081710

(51) Int. Cl.[7] ................................................ H02G 3/18

(52) U.S. Cl. .......................... 174/59; 174/135; 174/60; 220/3.8; 439/579; 361/622

(58) Field of Search ................................ 174/59, 72 A, 174/60, 135, 17 CT; 220/3.8; 439/579; 361/622

(56) References Cited

U.S. PATENT DOCUMENTS

| | | | | |
|---|---|---|---|---|
| 3,951,490 A | * | 4/1976 | Devendorf | 439/63 |
| 6,068,511 A | * | 5/2000 | Hsiang | 439/579 |
| 6,121,548 A | * | 9/2000 | Matsuoka | 174/59 |
| 6,196,882 B1 | * | 3/2001 | Sato et al. | 439/701 |
| 6,353,183 B1 | * | 3/2002 | Ott et al. | 174/59 |
| 6,545,860 B1 | * | 4/2003 | Pierce | 361/622 |

* cited by examiner

*Primary Examiner*—Dhiru R Patel
(74) *Attorney, Agent, or Firm*—Rosenthal&Osha L.L.P.

(57) ABSTRACT

A housing is disclosed, which includes a housing main body for containing a contact connected with a central conductor of a coaxial cable, a housing lid formed such that one side of an upper edge portion of the housing main body constitutes a fixed end thereof, for covering an upper side of the contact by being bent to fold at the fixed end such that a free end side thereof is brought into contact with other side of the upper edge portion of the housing main body, and a first latching mechanist formed at the other side of the upper edge portion of the housing main body and the free end side of the housing lid for maintaining a state of bringing the housing lid and the housing main body into contact with each other.

13 Claims, 11 Drawing Sheets

HOUSING AND COAXIAL CONNECTOR HAVING THE SAME

FIELD OF THE INVENTION

The present invention relates to a housing used in electronic apparatus of information terminal apparatus, computer related apparatus and the like and a coaxial connector having the housing.

BACKGROUND OF THE INVENTION

When a coaxial connector is fabricated, first, a central conductor of a coaxial connector is soldered to a contact, and a housing made of synthetic resin having a housing main body with a housing lid open and a shell having a shell main body with a shell lid open are prepared. Next, the housing main body is inserted into the shell main body and the soldered contact is inserted into the housing main body. Thereafter, by closing the housing lid, the contact is contained in the housing while being held in a regular containing attitude. Successively, the contact and the housing are contained in the shell by closing the shell lid and thereafter the shell is crimped to constitute the coaxial connector.

Meanwhile, when the housing lid is opened and the contact in the housing is floated up, the contact is not poised in the regular containing attitude and therefore, when the shell is crimped, there is brought about a failed product in which the contact is shifted inside the housing. Further, in JP-A-8-17523, there is disclosed a constitution in which latching portions are provided at both side faces on a fixed end side of a housing lid and when the housing lid is closed, the latching portions are latched by a housing main body. According to the constitution, when the housing lid is closed, the housing lid is latched by the housing main body by the latching portions and therefore, a state of the housing lid being closed is maintained, as a result, a contact is prevented from floating up.

However, according to the constitution of the background art, there poses a problem that the housing lid is liable to deform to turn up. That is, according to the constitution of the background art, the latching portions are provided on the fixed end side of the housing lid and the latching portions do not cover up to a contact containing hole in the state of the housing lid being closed. Further, the housing lid generally covers only an upper side of the contact containing hole from the fixed end side and does not cover up to an upper side of a cable. Further, the housing lid is formed in a thin-walled shape for low height formation of the connector, further, among synthetic resin materials used, there are some materials which are not provided with high rigidity and therefore, when upward force is exerted to the contact or the coaxial cable connected to the contact even by a small amount thereof, the housing lid is deformed to turn up and the contact is floated up.

Therefore, it is an object of the invention to provide a housing capable of making a housing lid difficult to open and difficult to turn up in order to prevent a contact from floating up and a coaxial connector having the housing.

SUMMARY OF THE INVENTION

A housing according to the invention comprises a housing main body for containing a contact connected with a central conductor of a coaxial cable, a housing lid formed such that one side of an upper edge portion of the housing main body constitutes a fixed end thereof for covering an upper side of the contact by being bent to fold at the fixed end such that a free end side thereof is brought into contact with other side of the upper edge portion of the housing main body, and a first latching mechanism formed on the other side of the upper edge portion of the housing main body and the free end side of the housing lid for maintaining a contact state of the housing lid with the housing main body.

According to the above-described constitution, when the free end side of the housing lid brought into contact with the other side of the upper edge portion of the housing main body by being bent and folded at the fixed end on the one side of the upper edge portion of the housing main body, at the free end side of the housing lid and the other side of the upper edge portion of the housing main body, holding force by the first latching mechanism is operated to maintain the contact state. Further, since the first latching mechanism is arranged on the free end side sufficiently remote from the fixed end of the housing lid, in comparison with, for example, a case in which the first latching mechanism is provided on the root side of the housing lid, the holding force exerted to the housing lid is operated as a large moment.

As a result, since the holding force can be operated by sufficiently large moment, even when upward force is exerted to the contact or the coaxial cable connected to the contact, the housing lid can be made to be difficult to deform and can be prevented from turning up. Thereby, the housing lid can be prevented from opening and therefore, a drawback that the contact contained in the housing main body is floated up to be out of a regular containing attitude can be prevented. Particularly, even when the housing is formed in a thin-walled shape for low height formation of a connector, or of a synthetic resin material which is not provided with high rigidity, the housing lid can sufficiently be prevented from floating up.

Further, the housing of the invention is characterized in that the housing main body contains the contact such that the free end side of the housing lid covers an upper side of a dielectric portion of the coaxial cable.

According to the constitution, when upward pushing force is exerted to the coaxial cable, the dielectric portion side of the coaxial cable can be prevented from floating up by covering the upper side of the dielectric portion of the coaxial cable with the free end side of the housing lid. As a result, the pushing up force from the coaxial cable can be made difficult to transmit to the contact and the housing lid can be prevented from turning up upwardly. Thereby, the contact can be contained in the housing main body with a regular containing attitude and the contact can be prevented from floating up.

Further, the housing of the invention is characterized in further comprising a second latching mechanism formed at predetermined portions of the housing main body and the housing lid other than portions thereof formed with the first latching mechanism for maintaining the contact state of the housing lid with the housing main body.

According to the above-described constitution, engagement of the housing lid to the housing main body is ensured by the holding forces of the first latching mechanism and the second latching mechanism.

Further, the housing of the invention is characterized in that the housing main body contains the contact such that the dielectric portion of the coaxial cable is disposed at a portion thereof deviated from the free end side of the housing lid, and the housing lid is formed with a cover portion to cover the upper side of the dielectric portion of the coaxial cable maintained in the housing main body.

According to the above-described constitution, by covering the upper side of the dielectric portion of the coaxial cable with the cover portion, when upward pushing force is exerted to the coaxial cable, the dielectric portion side of the coaxial cable can be prevented from floating up. As a result, the pushing up force from the coaxial cable can be made difficult to transmit to the contact. Thereby, the contact can be contained inside the housing main body in the regular containing attitude and the contact can be prevented from floating up.

Further, the housing of the invention is characterized in that comprise a third latching mechanism is provided with the cover portion and the housing main body for maintaining a state of the upper side of the dielectric portion of the coaxial cable covered.

According to the above-described constitution, the pushing up force from the coaxial cable can be made further difficult to transmit to the contact, and the housing lid can further be prevented from turning up upwardly. Thereby, the contact can be contained inside the housing main body in the regular containing attitude and the contact can be prevented from floating up.

Further, the housing of the invention is characterized in further comprising a fourth latching mechanism formed at predetermined portions of the housing main body and the housing lid other than portions thereof formed with the first latching mechanism and the cover portion for maintaining the contact state of the housing lid with the housing main body.

According to the above-described constitution, engagement of the housing lid to the housing main body is further ensured by the holding force of the fourth latching mechanism.

Further, the housing of the invention is characterized in that the housing main body is formed with a concave portion for containing a contact fixing portion constituted by extending a portion of the contact, and the housing lid is formed to be brought into contact with the contact fixing portion contained in the concave portion.

According to the above-described constitution, since the contact fixing portion is contained in the concave portion while being brought into contact with the housing lid the contact is fixed inside the housing main body in a stable state, and as a result, the contact can be contained inside the housing main body in the regular containing attitude and the contact can be prevented from floating up.

Further, the housing of the invention is characterized in that the housing main body is formed with a concave portion for containing a contact fixing portion constituted by extending a portion of the contact, and a lower face of the housing lid is formed with a convex portion for pinching the contact fixing portion by being fitted to the concave portion.

According to the above-described constitution, since the contact fixing portion is pinched by the concave portion and the convex portion, the contact is fixed inside the housing main body in a stable state, and as a result, the contact can be contained inside the housing main body in the regular containing attitude and the contact can be prevented from floating up.

Further, the housing of the invention is characterized in that the convex portion of the housing lid is fitted to the concave portion of the housing main body by press-fitting.

According to the above-described constitution, the contact fixing portion is pinched by the concave portion and the convex portion by press-fitting and therefore, the contact can be fixed inside the housing main body in a stable state and solidly.

Further, the housing of the invention is characterized in that when the housing main body is contained inside a shell main body with a shell lid erected, a positional relationship in which the housing lid erected from the housing main body and the shell lid do not overlap in an erected state is constituted.

According to the above-described constitution, the shell lid and the housing lid are arranged not to overlap each other and therefore, when the housing lid is closed, operation can easily be carried out without being hampered by the shell lid.

Further, a coaxial connector of the invention is characterized in including a housing having any one or more of the above-described respective characteristics.

BRIEF DESCRIPTION OF THE DRAWINGS

FIG. 1A shows a state viewed from a front side and FIG. 1B from a rear side.

FIG. 4A shows a state before soldering and FIG. 4B shows a state after soldering.

FIG. 5A shows a state viewed from a front side and FIG. 5B from a rear side.

FIG. 6A shows a state viewed from a front side and FIG. 6B from a rear side.

FIG. 9A is a front view, FIG. 9B is a side view and FIG. 9C is a plane view.

FIG. 10A shows a state viewed from a front side and FIG. 10B from a rear side.

DESCRIPTION OF THE PREFERRED EMBODIMENTS

An explanation will be given of a housing according to an embodiment of the invention and a coaxial connector having the housing in reference to FIGS. 1A through FIG. 11 as follows.

Figure 2:
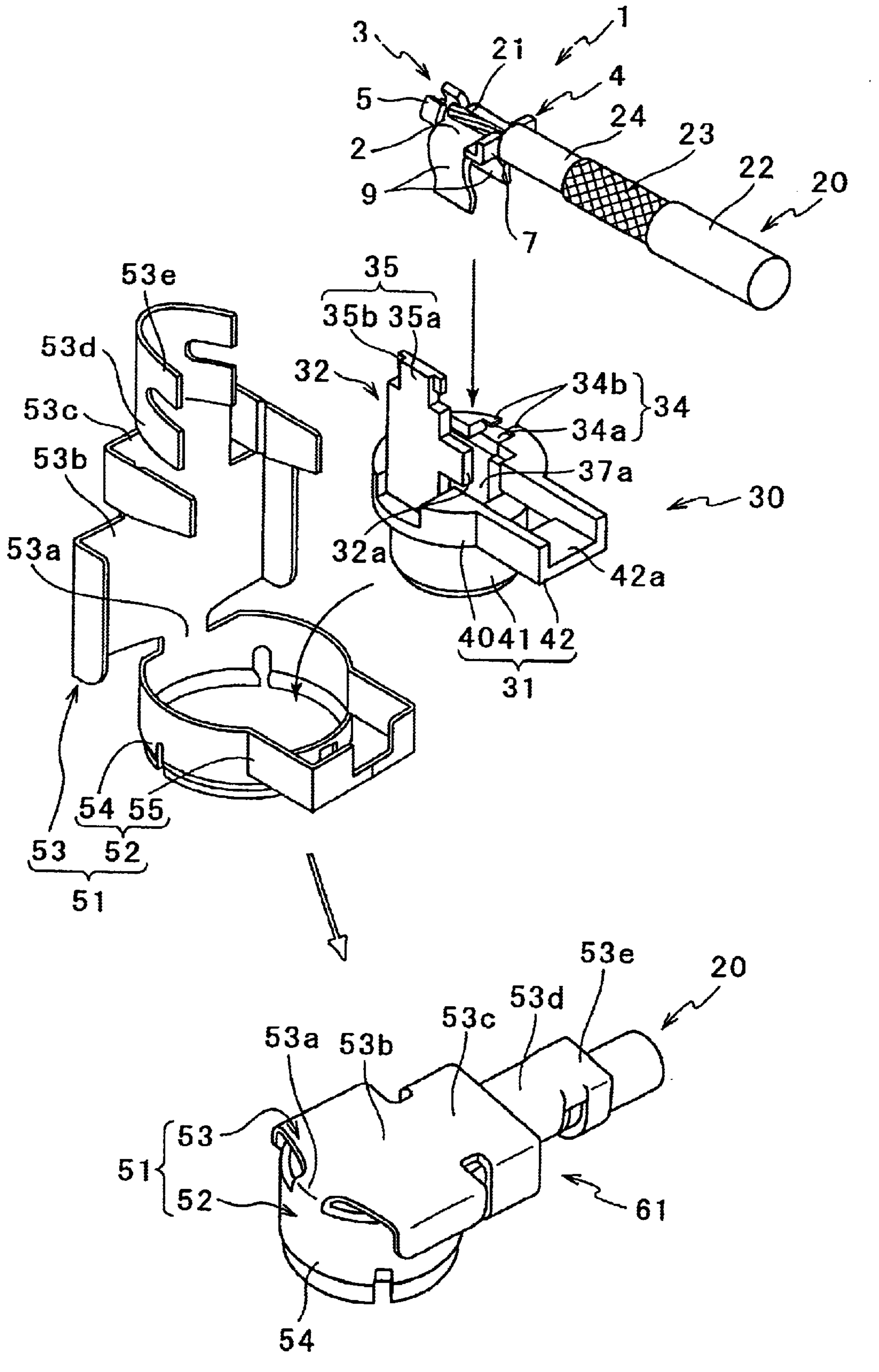
FIG. 2 is an explanatory view showing a coaxial connector being integrated.

As shown by FIG. 2, according to the embodiment, a housing contains a contact 1 inside thereof and is contained inside a coaxial connector 61. The contact 1 is formed by processing a plate-like metal material. Further, as the plate-like metal material, metals such as iron, aluminum, copper and alloys having these metals as a major component can be pointed out. The contact 1 includes a connecting line portion 2 to which a central conductor 21 of a coaxial cable 20 is connected by soldering while being in contact therewith. The coaxial cable 20 is provided with an outer skin 22, a shield conductor 23, an insulator 24 and the central conductor 21 in this order from an outer peripheral side thereof to a central portion thereof and is constituted such that the shield conductor 23 at ground potential is disposed surrounding the central conductor 21 for transmitting and receiving a data signal.

The above-described connecting line portion 2 is formed in a flat shape to make solder difficult to flow. A pair of left and right contact portions 9, 9 having spring performance are provided at both end portions in the left and right directions of the connecting line portion 2. The two contact portions 9, 9 are hung from the connecting line portion 2 and fitted to a counter side connector, not illustrated. Meanwhile, a first positioning portion 3 and a second positioning portion 4 are respectively provided at a front end portion and a rear end portion of the connecting line portion 2. The first and the second positioning portions 3, 4 can support the central conductor 21 at a plurality of portions in an axis core direction of the central conductor 21 to position the central conductor 21 at a predetermined position of the connecting line portion 2.

Here, the front end portion of the connecting line portion 2 means an end portion of the connecting line portion 2 disposed on a front end side of the central conductor 21 when the axis core direction of the central conductor 21 which is brought into contact with the connecting line portion 2 is referred as the front-rear direction. Meanwhile, the rear end portion of the connecting line portion 2 means an end portion of the connecting line portion 2 disposed on a rear end side (root side) of the central conductor 21. Further, the left and right direction refers to a direction orthogonal to the axis core direction of the central conductor 21 and in parallel with an upper face of the connecting line portion 2. An up and down direction refers to a direction orthogonal to the axis core direction of the central conductor 21 and orthogonal to the upper face of the connecting line portion 2.

Figure 4A:
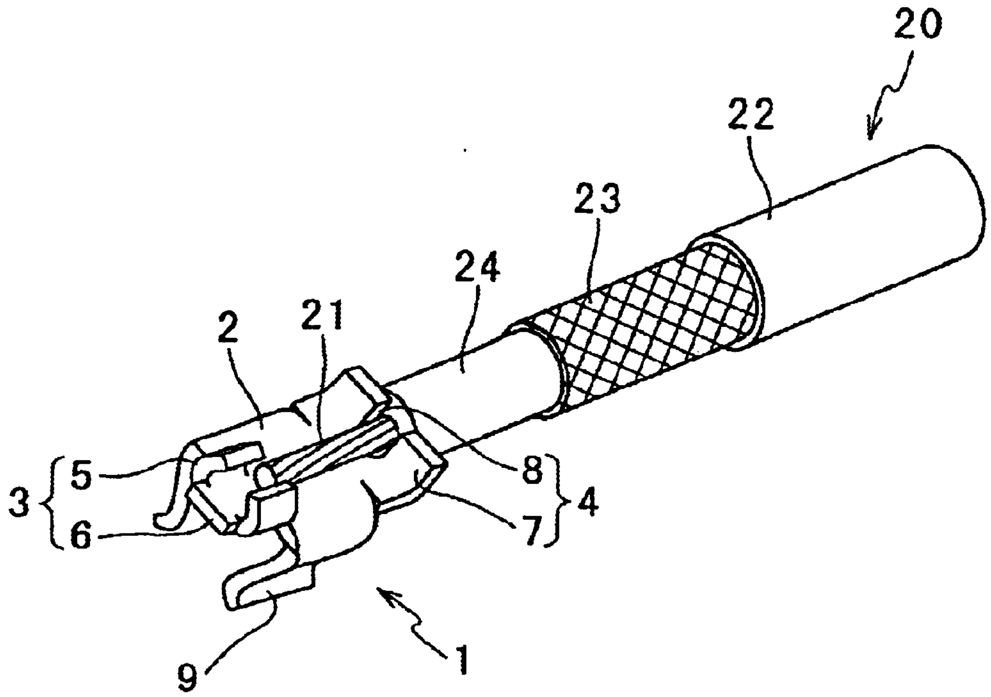
FIGS. 4A and 4B are explanatory views showing states of connecting a coaxial cable and a contact for the coaxial connector.
Figure 4B:
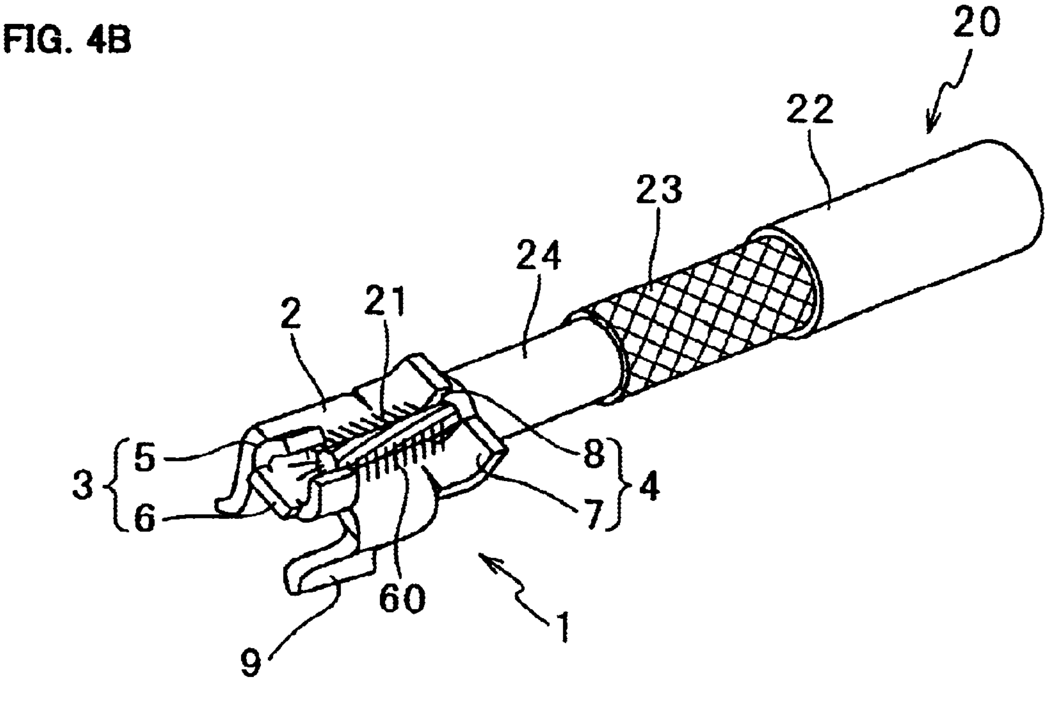

As shown by FIGS. 4A and 4B, the first positioning portion 3 provided at the front end portion of the connecting line portion 2 includes a mounting portion 6 for mounting a front end portion of the central conductor 21 and support pieces 5, 5 arranged in a left and right pair thereof with the mounting portion 6 being as the center. The mounting portion 6 is formed projected frontward from a central portion of the connecting line portion 2. Further, the support pieces 5, 5 are formed by cutting and raising portions in the left and right direction of the first positioning portion 3 and opposed to both sides of the central conductor 21.

An interval between the two support pieces 5, 5 is set to equivalent to or slightly wider than a diameter of the central conductor 21 such that side faces of the central conductor 21 can be supported from the both sides. Further, when central positions of the two support pieces 5, 5 are constituted by predetermined positions, it is preferable that the above-described interval is set to a degree of not bringing about trouble in soldering even when shifted from the predetermined positions. Thereby, the first positioning portion 3 can restrict a position in the left and right direction of the front end portion of the central conductor 21 which is most liable to shift from the predetermined position of the connecting line portion 2 by the support pieces 5, 5. Further, the first positioning portion 3 can make the support pieces 5, 5 present over a wide range in the front and rear direction and therefore, even when there is more or less error in a length of the central conductor 21 exposed, the front end portion of the central conductor 21 can firmly be disposed between the support pieces 5, 5.

Further, entire of the two support pieces 5, 5 from lower portion to upper portion thereof is bent to inner side direction. Thereby, according to the first positioning portion 3, by reducing the interval between the two support pieces 5, 5 from the lower portions to the upper portions, positioning of the central conductor 21 in the left and right direction and the up and down direction in the first positioning portion 3 can be carried out with high accuracy. Further, the entire of the two support pieces 5, 5 from the lower portion to the upper portion may be inclined in the inner side direction, or the two support pieces 5, 5 may be erected from the lower portions to the upper portions and only the upper portions may be bent or bent and folded to the inner side directions.

Meanwhile, the rear end portion of the connecting line portion 2 is provided with the second positioning portion 4. The second positioning portion 4 includes a positioning piece 7 formed by cutting to raise a portion of the second positioning portion 4 in the axis core direction of the central conductor, and a guide groove 8 formed at a central portion of the positioning pieces 7. The guide groove 8 is set to a width equivalent to or slightly wider than the diameter of the central conductor 11. Further, when a central position of the guide groove 8 is constituted to be a predetermined position, it is preferable that the groove width of the guide groove 8 is set to a degree not bringing about trouble in soldering even when shifted from the predetermined position. Thereby, the second positioning portion 4 enables to support the root side of the central conductor 21 in the left and right direction and enables to accurately position the central conductor 21 also in the front and rear direction by bringing the positioning piece 7 into contact with an end face of the insulator 24.

Figures 1A, 1B:
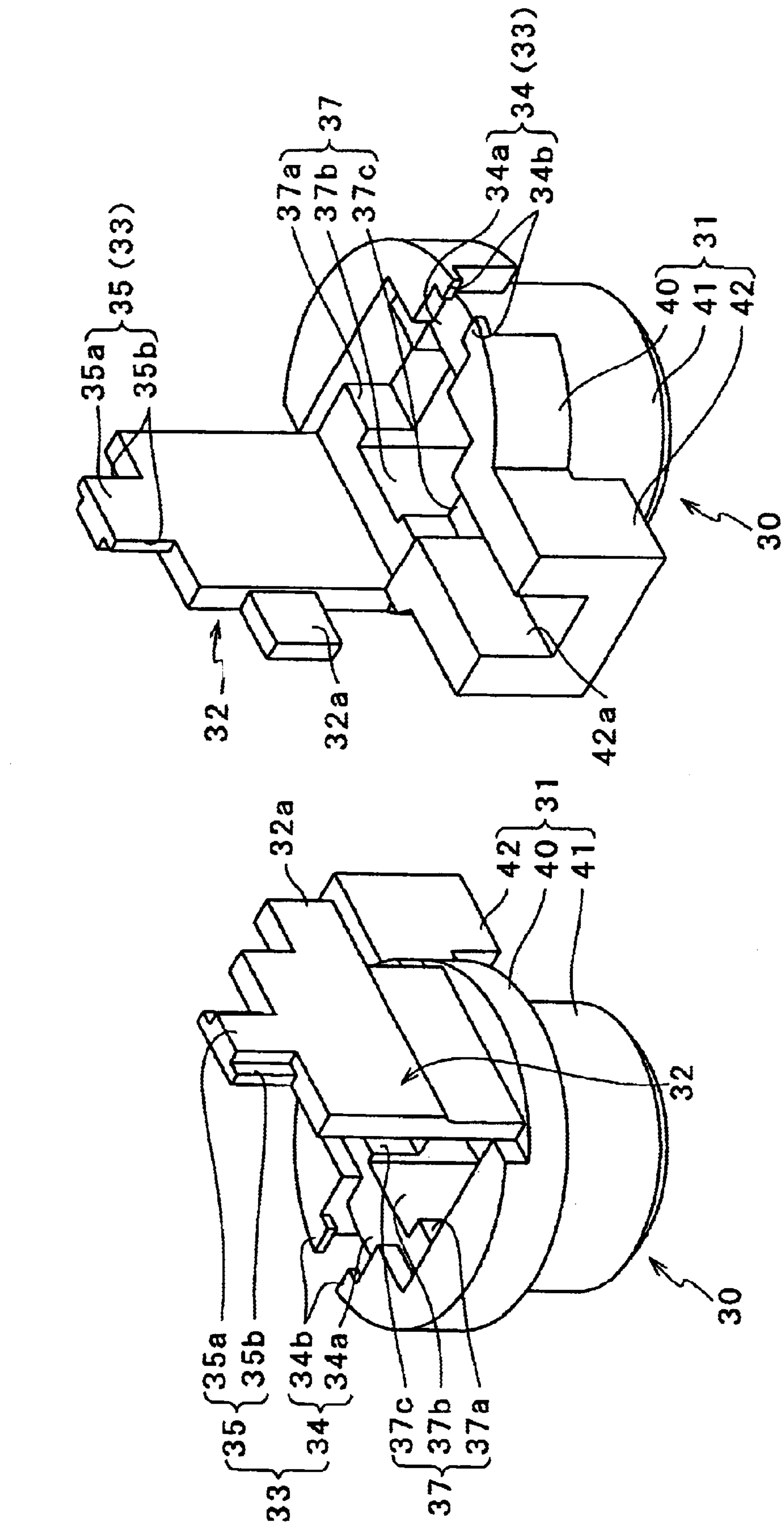
FIGS. 1A and 1B are perspective views of a housing.

As shown by FIG. 2, the contact 1 constituted as described above is contained in a housing 30. As shown by FIGS. 1A and 1B, the housing 30 is formed by molding an insulating material. Here, as an insulating material, any material which is synthetic resin of PBT, nylon species, PPS species, LCP species and the like and provided with insulating performance can be used, The housing 30 includes a housing main body 31 substantially in a cylindrical shape, a housing lid 32 covering an upper side of the contact, and a first latching mechanism 33 for maintaining a contact state of the housing lid 32 with the housing main body 31. The housing lid 32 is formed such that one side of an upper end portion of the housing main body 31 constitutes a fixed end thereof. Further, by bending and folding the housing lid 32 at the fixed end, a free end side thereof can be brought into contact with other side of the upper edge portion of the housing main body 31 to cover the upper side of the contact 1.

The above-described housing main body 31 is provided with an upper side housing portion 40 and a lower side housing portion 41 respectively on an upper side and a lower side thereof. Further, the housing main body 31 is provided with a contact containing hole 37 for containing the contact 1 at a central portion thereof. The contact containing hole 37 includes a first containing portion 37*a*, a second containing portion 37*b* and a third containing portion 37*c*. The second containing portion 37*b* is arranged at the central portion of the contact containing hole 37 and communicated with the housing main body 31 penetrated from its upper face to its lower face. Further, the first containing portion 37*a* contains the connecting line portion 2 and the contact portions 9, 9 of the contact 1 of FIG. 2. Further, the first containing portion 37*a* and the third containing portion 37*c* are arranged respectively on one side and the other side with the second containing portion 37*b* being the center thereof. The second containing portion 37*b* and the third containing portion 37*c* are formed in a recessed shape in the upper side housing 40. Further, the first containing portion 37*a* contains the first positioning portion 3 on the front end side of the contact 1 of FIG. 2. The third containing portion 37*c* contains the second positioning portion 4 on the tear end side of the contact 1 of FIG. 2.

Further, the upper side housing portion 40 is provided with a main body side latching portion 34. The main body side latching portion 34 is arranged on other side of the upper edge portion of the housing main body 31 with which the free end side of the above-described housing lid 32 is brought into contact. The main body side latching portion 34 includes a fitting groove 34*a* set to a predetermined width and projected portions 34*b*, 34*b* projected inwardly from upper end portions of side faces of the fitting groove 34*a*. The fitting groove 34*a* is formed in a radius direction from the contact containing hole 37 to an outer peripheral face.

The above-described main body side latching portion 34 constitutes a portion of the first latching mechanism 33. The first latching mechanism 33 is provided with a lid side latching portion 35 in addition to the above-described main body side latching portion 34. The lid side latching portion 35 is arranged on the free end side of the housing lid 32. The lid side latching portion 35 includes a projected piece 35*a* projected from substantially a central portion of the free end of the housing lid 32. A width of the projected piece 35*a* is set to be equal to the interval between the projected portions 34*b*, 34*b*. Further, stepped portions 35*b*, 35*b* are formed at both side faces of the projected piece 35*a*. A width including the stepped portion 35*b*, 35*b* and the projected piece 35*a* is set to be a width slightly narrower than the groove width of the fitting groove 34*a*. When the projected piece 35*a* is fitted to the fitting groove 34*a*, upper faces of the stepped portions 35*b*, 35*b* are brought into contact with the projected portions 34*b*, 34*b*. Further, by bringing the stepped portions 35*b*, 35*b* into contact with the projected portions 34*b*, 34*b*, holding force for maintaining the housing lid 32 of being brought into contact with the housing main body 31 is produced.

Further, as shown by FIG. 2, the upper side housing portion 40 of the housing main body 31 is formed with the cable containing portion 42 for containing the insulator 24 of the coaxial cable 24. The cable containing portion 42 is linearly formed with the containing groove 42*a*. The containing groove 42*a* is set to the groove width and the groove depth larger than the outer diameter of the insulator 24 to contain the insulator 24 therein. Further, as shown by FIG. 1A, the containing groove 42*a* is formed to direct from a side face of the housing main body 31 to the central portion of the housing main body 31, and in a groove direction of the containing groove 42*a*, the third containing portion 37*c*, the second containing portion 37*b* and the first containing portion 37*a*, mentioned above, are arranged in this order from the side of the containing groove 42*a*. Thereby, as shown by FIG. 2, the contact 1 soldered with the coaxial cable 20 is brought into a fixed state in a horizontal face by containing the first positioning portion 3, the connecting line portion 2, the second positioning portion 4 and the insulator 24 respectively into the first containing portion 37*a*, the second containing portion 37*b*, the third containing portion 37*c* and the cable containing portion 42.

As shown by FIGS. 1A and 1B, the groove direction of the containing groove 42*a* in the above-described cable containing portion 42 is set to be orthogonal to a longitudinal direction of the housing lid 32 which is brought into contact with the housing main body 31. Thereby, the housing lid 32 covers the contact 1 by closing the housing lid 32 from a side direction of the coaxial cable 20 contained in the housing main body 31. Further, it is preferable that the first positioning portion 3 and the second positioning portion 4 of the contact 1 are covered with the housing lid 32 while being in contact therewith, or covered there with being press contact therewith. In this case, the two positioning portions 3 and 4 can solidly be fixed.

A cover portion 32*a* is formed at a side face of the above-described housing lid 32. The cover portion 32*a* is arranged to cover an upper side of the shield conductor 23 of the coaxial cable 20 contained in the cable containing portion 42. Further, by covering the upper side of the shield conductor 23, the cover portion 32*a* can prevent the side of the shield conductor 23 from floating up when force of pushing upwardly is exerted to the coaxial cable 20. Further, the cover portion 32*a* may cover the coaxial cable 20 with a gap therebetween, may cover the coaxial cable 20 in a contact state therewith, or may cover the coaxial cable 20 in a press contact state therewith.

As shown by FIG. 2, the housing 30 constituted as described above is contained in a shell 51. The shell 51 is formed by processing a metal plate. Here, as a material for the metal plate, metals such as iron, aluminum, copper and alloys having these metals as their major components can be pointed out. The shell 51 includes a shell main body 52 for containing the housing 30 therein and a shell lid 53 integrally provided to the shell main body 52. The shell main body 52 includes a housing main containing portion 54 and a housing sub containing portion 55. The housing main containing portion 54 is formed in a shape of cylinder with its upper face and lower faces open so as to contain the upper side housing portion 40 and the lower side housing portion 41 therein. Further, the housing sub containing portion 55 is formed in a shape of box an upper face of which is opened to contain the cable containing portion 42 of the housing main body 31.

Meanwhile, the shell lid 53 is provided at an upper edge portion of the housing main containing portion 54. The shell lid 53 is arranged to be opposed to the housing sub containing portion 55 and made to be able to bend to fold at a connecting portion 53*a*. The shell lid 53 includes a first lid portion 53*b* for covering the upper face of the housing main containing portion 54, a second lid portion 53*c* for covering the upper face of the housing sub containing portion 55, a conductor press attach portion 53*d* which is to be brought into press attach with the shield conductor 23 of the coaxial cable 23, and an outer skin press attach portion 53*e* which is to be brought into press attach with the outer skin 22 of the coaxial cable 20. Further, the shell lid 53 before being bent to fold is in an erected state to the housing main containing portion 54 to be able to contain the housing 30 by opening the upper face of the housing main containing portion 54. Further, when the shell lid 53 is inclined to ward the shell main body 52 by being bent to fold at the connecting portion 53*a*, the upper faces of the upper side housing portion 40 and the cable containing portion 42 contained in the shell main body 52 are allowed to be covered respectively by the first lid portion 53*b* and the second lid portion 53*c* and the conductor press attach portion 53*d* is allowed to be brought into press attach with the shield conductor 23 of the coaxial cable 20.

The above-described shell lid 53 is arranged such that the longitudinal direction of the shell lid 53 is orthogonal to the longitudinal direction of the housing lid 32 when the shell lid 53 is inclined to fall to the shell main body 52. Further, the shell lid 53 can be arranged at an arbitrary position so far as the shell lid 53 is set in a positional relationship that the shell lid 53 does not overlap the housing lid 32 in the erected state.

In the above-described constitution, a method of fabricating the housing 30 and the coaxial connector will be explained.

(Contact Fabricating Step)

First, as shown by FIG. 2, a thin metal plate in a strip-like shape is prepared and the strip-like metal plate is carried into a pressing apparatus. In the pressing apparatus, while one side in a width direction of the strip-like metal plate is remained as a carrier, the other side thereof is cut and deformed, and thereby, the contacts 1 connected to the carrier, not illustrated, at equal intervals are continuously formed. Thereafter, the contacts 1 are wound to a reel in a roll-like shape along with the carrier.

(Housing Fabricating Step)

In a housing fabricating step, the housing 30 is formed by molding such as injection molding. That is, a die having a cavity in correspondence with an outer shape of the housing 30 as shown by FIGS. 1A and 1B is prepared. Incidentally, it is preferable that the cavity is formed such that a plurality of housings 30 can be molded by one step of injection molding. Thereafter, the die is set to an injection molding machine and a granular synthetic resin material having insulating performance is supplied to the injection molding machine. Then, in the injection molding machine, the synthetic resin material is heated and pressed into a liquid state and pressed into the cavity inside the die. After cooling for a predetermined period of time, the die is opened and the housing 30 is taken out from it.

(Soldering Step)

The above-described contact 1 in the roll state is set to a reel out apparatus and the contact located in the front end is mounted to a fixing tool for welding operation. Incidentally, mounting the contact 1 is mounted, to prevent flow of solder, such that the upper face of the connecting line portion 2 becomes horizontal. Thereafter, as shown by FIG. 4A, the coaxial cable 20 cut in a predetermined length is prepared. By subjecting a front end portion of the coaxial cable 20 to a two-stage peeling process by a jig of a stripper or the like, the central conductor 21, the insulator 24 and the shield conductor 23 are respectively exposed. A exposed length of the central conductor 21 is set to a value substantially equal to the interval between the first positioning portion 3 and the second positioning portion 4 of the contact 1 so that the front end portion of the central conductor 21 is disposed inside the first positioning portion 3. Further, the coaxial cable 20 previously subjected to the two-stage peeling may be prepared.

Next, the coaxial cable 20 subjected to the two-stage peeling is moved to the fixing piece on an upper side of the contact 1. The coaxial cable 20 is set to the contact 1 such that the central conductor 21 is brought into contact with the connecting line portion 2 of the contact 1. At this occasion, the end face of the insulator 24 of the coaxial cable 20 is brought into contact with the positioning pieces of the second positioning portion 4. Thereby, the central conductor 21 is positioned in the front and rear direction of the connecting line portion 2. As a result, the rear end portion constituting the root side of the central conductor 21 is positioned inside the guide groove 8 of the second positioning portion 4 and the front end side is positioned between the support pieces 5, 5 of the first positioning portion 3. Incidentally, even when there is more or less error in the exposed length of the central conductor 21, since the support pieces 5, 5 are formed by cutting to raise a portion of the first positioning portion 3 to be opposed at both sides of the central conductor 21, the central conductor 21 is, firmly disposed between the support pieces 5, 5.

As a result, two portions, the front end portion and the rear end portion of the central conductor 21, become supportable respectively by the positioning portions 3, 4, so that the central conductor 21 is positioned within an allowable range in the left and right direction relative to the predetermined position. Particularly, since the front end portion of the central conductor 21 which is most liable to shift from the predetermined position of the connecting line portion 2 is restricted in the left and right direction between the support pieces 5, 5, the front end portion is positioned in the left and right direction with high accuracy. Further, by reducing the interval between the two support pieces 5, 5 from the lower portions to the upper portions by being bent to the inner side directions, the front end portion of the central conductor 21 is brought into a state of being contained between the support pieces 5, 5. Thereby, even in a state in which the front end portion of the central conductor 21 is warped back upwardly, the front end portion of the central conductor 21 is positioned in the left and right direction and in the up and down direction.

Thereafter, as shown by FIG. 4B, the central conductor 21 is connected to the connecting line portion 2 by soldering while maintaining the contact state with the connecting line portion 2. When soldering is carried out, solder 60 in a liquid state flows from the central conductor 21 toward outer sides of the connecting line portion 2. At this occasion, the solder 60 flowing in the left and right direction of the connecting line portion 2 is sufficiently prevented from flowing out to the contact portions 9, 9 disposed at both end portions in the left and right direction since the central conductor 21 is disposed on a center line in the left and right direction of the connecting line portion 2. Further, the solder 60 flowing in the front and rear direction of the connecting line portion 2 is sufficiently prevented from leaking to the rear surface side of the connecting line portion 2 since the support pieces 5, 5 of the first positioning portion 3 and the positioning pieces 7 function as walls for hampering the solder from flowing. As a result, even when there is more or less dispersion in the exposed length of the central conductor 21, or the front end portion or entire of the central conductor 21 is curved, the central conductor 21 can firmly be connected to the connecting line portion 2 by soldering and a deterioration of quality by flowing out the solder 60 from the connecting line portion 2 can be prevented.

When the above-described soldering operation is finished, the contact 1 is cut from the carrier, not illustrated. Further, the contact 1 is removed from the fixing tool and is carried to a successive mounting step.

(Mounting Step)

At a mounting step, first, as shown by FIG. 2, the shell 51 is set to a mounting apparatus, not illustrated. Then, the housing 30 is set to the housing main containing portion 54 of the shell 51. At this occasion, by containing the cable containing portion 42 of the housing main body 31 in the housing sub containing portion 55 of the shell main body 52, the housing 30 is brought into a state of being fixed to the shell main body 52 in a horizontal plane.

Next, the contact 1 accompanied by the coaxial cable 20 formed at the soldering step is inserted into the contact containing hole 37 of the housing main body 31. Further, by containing the insulator 24 of the coaxial cable 20 in the containing groove 42*a* of the cable containing portion 42, the contact 1 is brought into a state of being fixed to the housing main body 31 in a horizontal plane. Thereafter, also as shown by FIGS. 1A and 1B, by bending to hold the fixed end portion of the housing lid 32, the housing lid 32 is inclined to fall to a side of the housing main body 31 and the free end side of the housing lid 32 is brought into contact with the other side of the upper edge portion of the housing main body 31. Thereby, by bringing the housing lid 32 into a closed state, the upper side of the contact 1 is covered with the housing lid 32.

Further, when the free end side of the housing lid 32 is brought into contact with the other side of the upper edge portion of the housing main body 31 by inclining to fall the housing lid 32, the lid side latching portion 35 of the housing lid 32 is fitted to the main body side latching portion 34 of the housing main body 31. As a result, by bringing the stepped portions 35*b*, 35*b* of the lid side latching portion 35 into contact with the projected portions 34*b*, 34*b* of the main body side latching portion 34, there is brought about a state that the lid side latching portion 35 and the main body side latching portion 34 are latched. The latched state generates holding force which functions to maintain the housing lid 32 inclined to fall, in other words, a contact state of the tree end side of the housing lid 32 with the other side of the upper edge portion of the housing main body 31.

At this occasion, as described above, the first latching mechanism 33 is arranged on the free end side sufficiently remote from the fixed end of the housing lid 32. Therefore, in comparison with, for example, a case in which a latching mechanism in correspondence with the first latching mechanism 33 is provided on the root side of the housing lid 32, the holding force exerted to the housing lid 32 works as large moment. As a result, since the holding force can be operated with sufficiently large moment, the contact state of the housing lid 32 can be ensured.

Further, when the housing lid 32 is brought into the closed state as described above, as shown by FIG. 2, the cover portion 32*a* covers the upper side of the insulator 24 of the coaxial cable 20. Thereby, even when upward force of pushing up the coaxial cable 20 is exerted thereto, the side of the insulator 24 of the coaxial cable 20 can be prevented from floating up.

Figure 3:
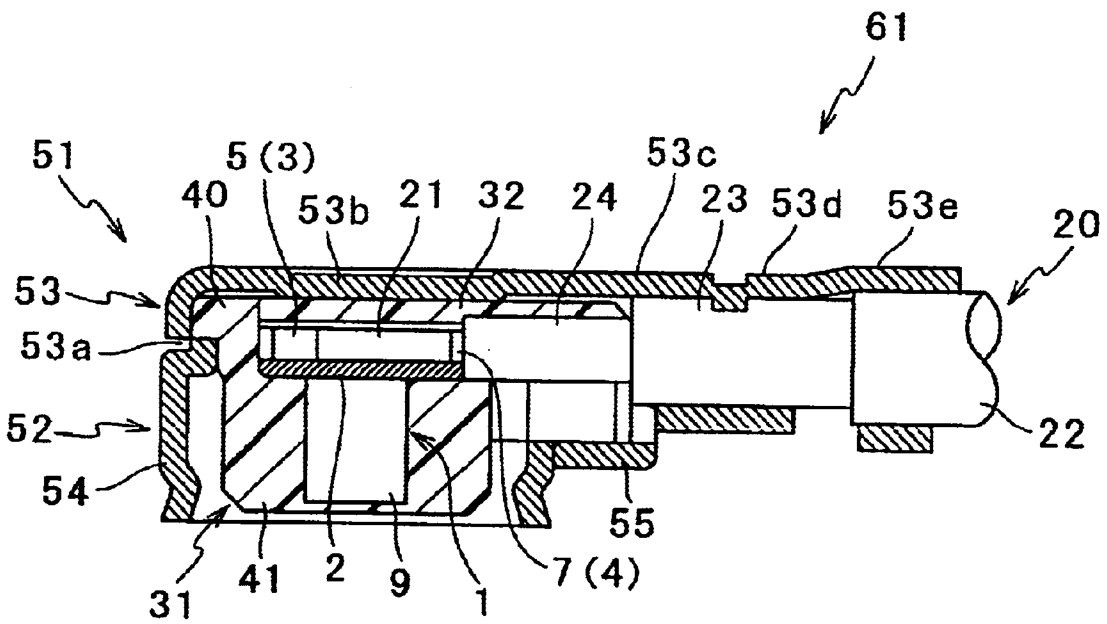
FIG. 3 is a sectional view of the coaxial connector.

Next, by bending to fold the connecting portion 53*a* of the shell lid 53, the shell lid 53 is inclined to fall in a direction of the shell main body 52. The housing portions 40, 41 of the housing main body 31 are covered with the first lid portion 53*b*. The insulator 24 of the coaxial cable 20 contained in the cable containing portion 42 is covered with the second lid portion 53*c*. Further, the shield conductor 23 and the outer skin 22 are brought into contact and press attach respectively with the conductor press attach portion 53*d* and the outer skin press attach portion 53*e*. As a result, as shown by FIG. 3, there is formed a coaxial connector 61 having a constitution in which the contact 1 soldered to connect with the central conductor 21 of the coaxial cable 20 and the shell 51 connected with the shield conductor 23 are electrically insulated from each other by the housing main boy 31. Incidentally, when the coaxial connector 61 is constituted by closing the shell lid 53, the housing lid 32 is maintained closed to the housing main body 31. Therefore, since the contact 1 is contained in the regular containing attitude inside the housing 30, an acceptable product of the coaxial connector 61 is formed with high yield.

As described above, as shown by FIGS. 1A and 1B and FIG. 2, the contact 1 of the embodiment is provided with the housing main body 31 for containing the contact 1 connected with the central conductor 21 of the coaxial cable 20, the housing lid 32 formed such that one side of the upper edge portion of the housing main body 31 constitutes the fixed end and covering the upper side of the contact side by being bent to fold at the fixed end such that the free end side is brought into contact with the other side of the upper edge portion of the housing main body 31, and the first latching mechanism formed on the other side of the upper edge portion of the housing main body 31 and the free end side of the housing lid 32 and maintaining the contact state of the housing lid 32 with the housing main body 31.

According to the above-described constitution, when the free end side of the housing lid 32 is brought into contact with the other side of the upper edge portion of the housing main body 31 by bending to fold the housing lid 32 at the fixed end on the one side of the upper edge portion of the housing main body 31, at the free end side of the housing lid 32 and the other side of the upper edge portion of the housing main body 31, the holding force by the first latching mechanism 33 operates to maintain the contact state. Further, since the first latching mechanism 33 is arranged on the free end side sufficiently remote from the fixed end of the housing lid 32, in comparison with, for example, the case in which the first latching mechanism 33 is provided on the root side of the housing lid 32, the holding force exerted to the housing lid 32 operates as large moment. As a result, even when upward force is exerted to the contact 1 or the coaxial cable 20 connected to the contact 1, the housing lid 32 can be made difficult to deform to prevent from turning up. Thereby, the housing lid 32 can be prevented from being opened and therefore, a drawback that the contact 1 contained in the housing main body 31 is floated up to be out of the regular containing attitude can be prevented.

Further, according to the embodiment, the housing main body 31 contains the contact 1 such that the insulator 24 of the coaxial cable 20 is disposed at a portion deviated from the free end side of the housing lid 32, and the housing lid 32 is formed with the cover portion 32*a* to cover the upper side of the insulator 24 of the coaxial cable 20 contained in the housing main body 31.

According to the above-described constitution, by covering the upper side of the insulator 24 of the coaxial cable 20 with the cover portion 32*a*, when upward pushing force is exerted to the coaxial cable 20, the side of the insulator 24 of the coaxial cable 20 can be prevented from floating up. As a result, the pushing up force from the coaxial cable 20 can be made difficult to transmit to the contact. Thereby, the contact 1 can be contained in the regular containing attitude inside the housing main body 31 and the contact 1 can be prevented from floating up.

Figure 5B:
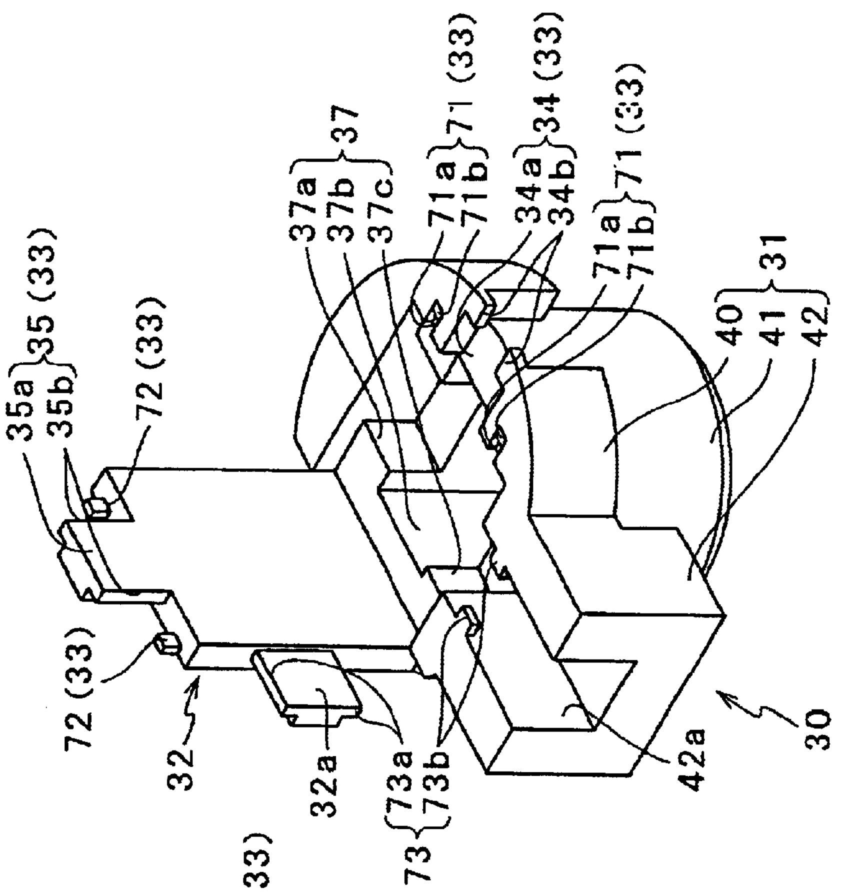
FIGS. 5A and 5B are perspective views of a housing.
Figure 5A:
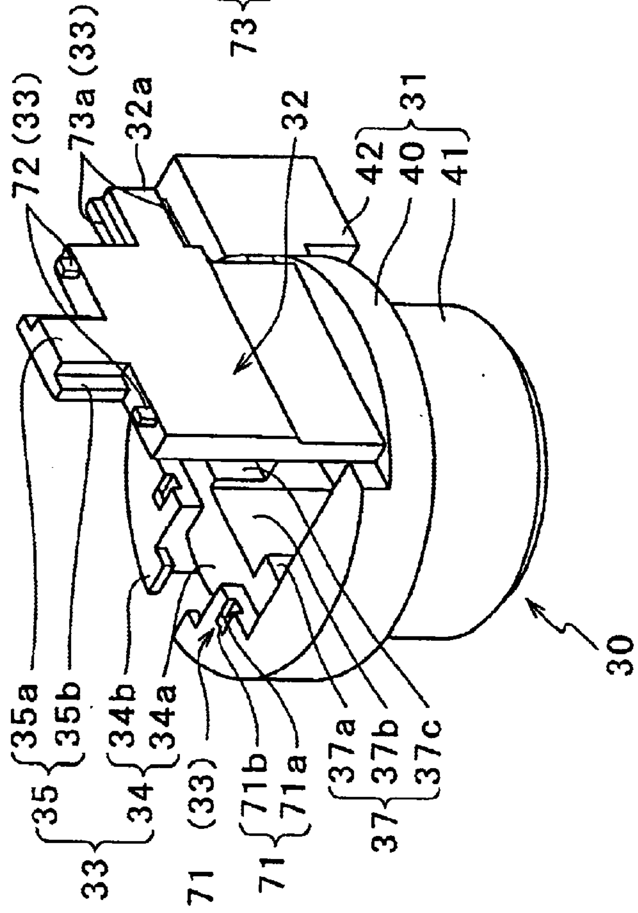

Although the invention has been explained based on the preferable embodiment, the invention can be modified within a range of not departing from the gist. That is, although according to the embodiment, the first latching mechanism 33 is constituted by a set of the main body side latching portion 34 and the lid side latching portion 35, the invention is not limited thereto but the first latching mechanism 33 may be constituted by two sets or more of the main body side latching portions 34 and the lid side latching portion 35. For example, as shown by FIGS. 5A and 5B, a left and right pair of main body side latching portions 71, 71 may further be arranged on both sides of the main body side latching portion 34 and a left and right pair of lid side latching portions 72, 72 may further be arranged on both sides of the lid side latching portion 35.

Each of the above-described main body side latching portions 71 is constituted by a fitting groove 71*a* opened to the contact containing hold 37, and the projected portion 71*b* projected from a wall face on a depth side of the fitting groove 71*a* to an opening side. Meanwhile, each of the lid side latching portions 72 is provided with a width to be fitted to the fitting groove 71*a* and a front end portion thereof is formed in a shape of a plate having a length latched by the projected portion 71*b*. Further, the first latching mechanism 33 constituted in this way can be maintained with the housing lid 32 closed by large holding force by respectively latching the lid side latching portions 35, 72, 72 by the main body side latching portions 34, 71, 71.

Further, the cover portion 32*a* and the housing main body 31 may be provided with a third latching mechanism 73 for maintaining the upper side of the insulator 24 of the coaxial cable 20 covered. The third latching mechanism 73 can be constituted by stepped portions 73*a*, 73*a* provided at both side faces of the cover portion 32*a* and projected portions 73*b*, 73*b* projected inwardly from upper end portions of both side faces of the containing groove 42*a*. According to the constitution, by latching the stepped portions 73*a*, 73*a* of the cover portion 32*a* by the projected portions 73*b*, 73*b* of the containing groove 42*a*, pushing up force from the coaxial cable 20 can be made further difficult to transmit to the contact 1 and the housing lid 32 can further be prevented from turning upwardly.

Figure 6B:
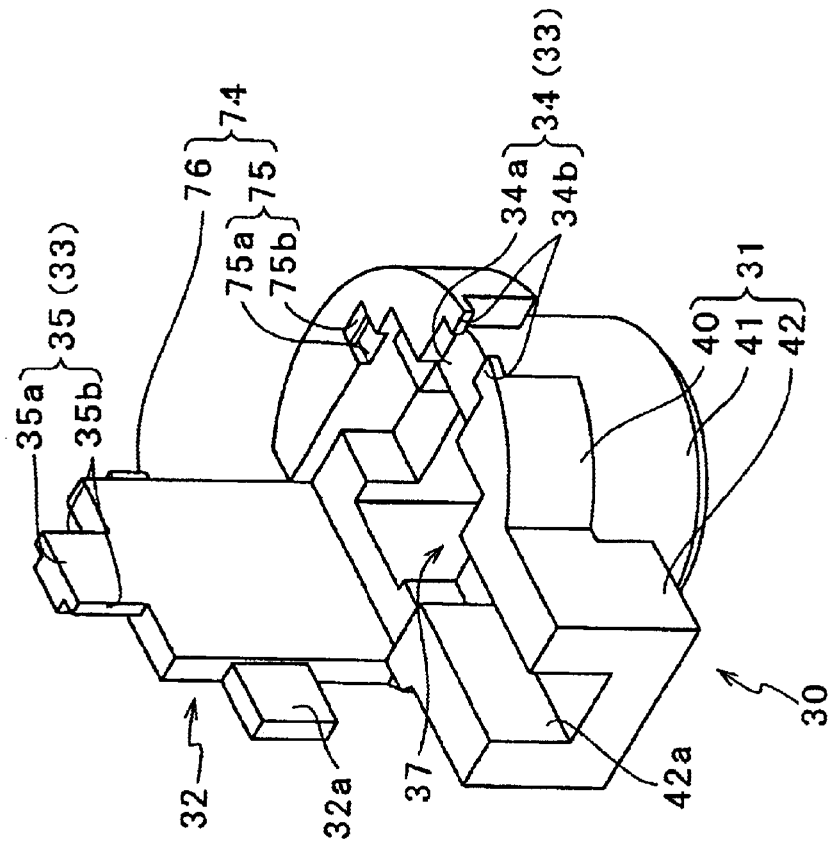
FIGS. 6A and 6B are perspective views of a housing.
Figure 6A:
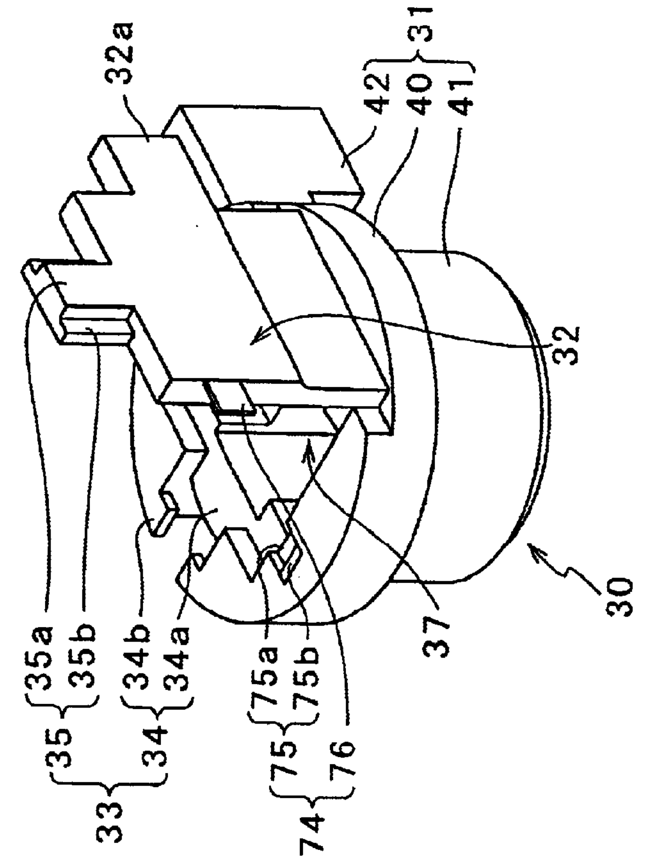

Further, as shown by FIGS. 6A and 6B, the housing 30 may be provided with a fourth latching mechanism 74 formed at predetermined portions of the housing main body, 31 and the housing lid 32 other than portions formed with the first latching mechanism 33 and the cover portion 32*a* for maintaining the contact state of the housing lid 32 with the housing main body 31 into contact with each other. Specifically, the fourth latching mechanism 74 includes a main body side latching portion 75 provided at the housing main body 31 and a lid side latching portion 76 formed at a side face of the housing lid 32. The main body side latching portion 75 is constituted by a fitting groove 75*a* opened to the contact containing hole 37 and a projected portion 75*b* projected from a wall face on a depth side of the fitting groove 75*a* to an opening side. Meanwhile, each of the lid side latching portions 72 is of a width fitted to the fitting groove 75*a* and a front end portion thereof is formed in a shape of a plate having a length to be latched by the projected portion 75*b*. According to the constitution, engagement of the housing lid 32 to the housing main body 31 is further ensured by the holding force of the fourth latching mechanism.

Further, although the housing 30 according to the embodiment is formed such that when the housing lid 32 is closed, the longitudinal direction of the housing lid 32 is orthogonal to the axis core direction of the coaxial cable 20 (central conductor 21), the invention is not limited thereto but the housing 30 may be formed such that the longitudinal direction is intersected therewith by an angle other than the right angle direction.

Figure 7:
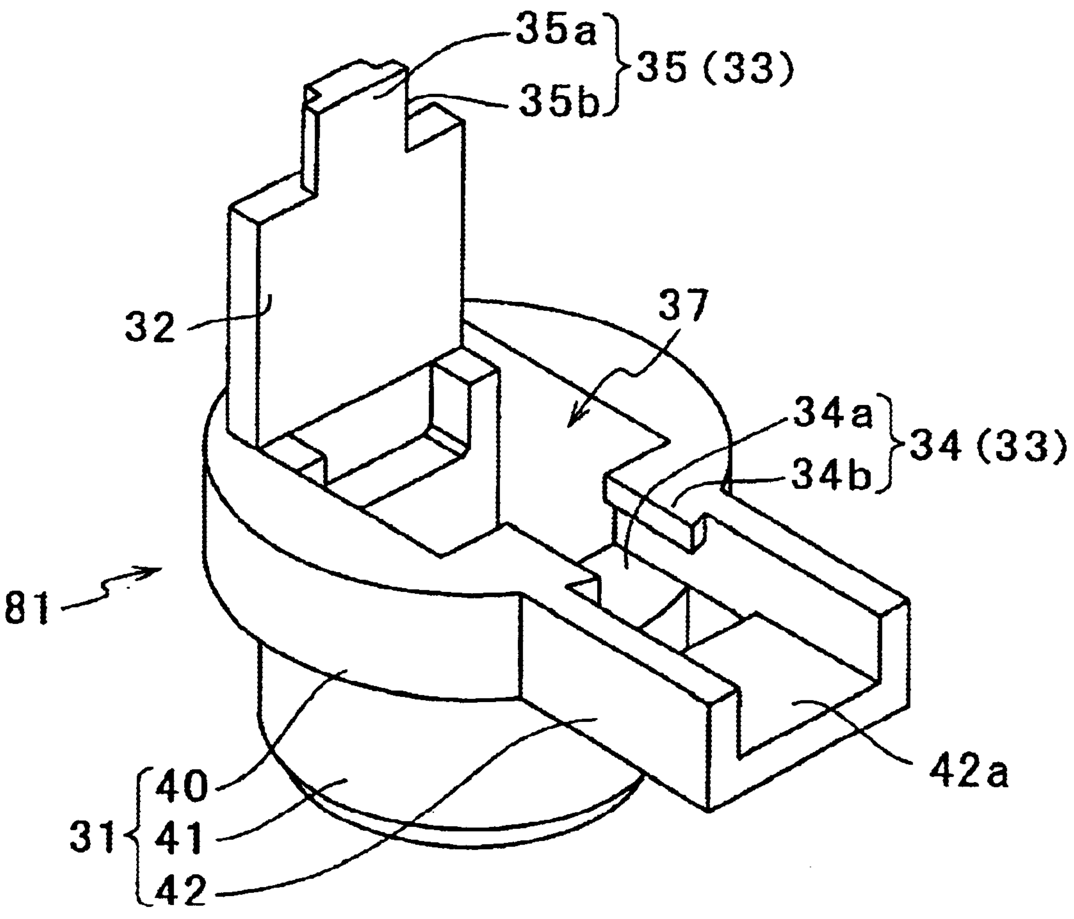
FIG. 7 is a perspective view of a housing.

Further, the housing main body 31 may be formed such that when the housing lid 32 is closed, the longitudinal direction of the housing lid 32 coincides with the axis core direction of the coaxial cable 20 (central conductor 21). That is, as shown by FIG. 7, a housing 81 may be constructed to contain the contact 1 such that the free end side of the housing lid 32 covers the upper side of the insulator 24 (dielectric portion) of the coaxial cable 20. Explaining more specifically, the fixed end of the housing lid 32 and the cable containing portion 42 are arranged to be opposed to each other via the contact containing hole 37. The free end side of the housing lid 32 is provided with the lid side latching portion 35 and the upper edge portion of the housing main body 31 on the side of the cable containing portion 42 is provided with the main body side latching portion 34.

According to the above-described constitution, by covering the upper side of the insulator 24 of the coaxial cable 20 with the free end side of the housing lid 32, when upward pushing force is exerted to the coaxial cable 20, the insulator 24 of the coaxial cable 20 can be prevented from floating up. As a result, pushing up force from the coaxial cable 20 can be made difficult to transmit to the contact 1 and the housing lid 32 can be prevented from turning upwardly. Further, the first latching mechanism 33 serves to achieve both pressing function of the coaxial cable 20 and maintaining function of the housing lid 32 in the closed state.

Figure 8:
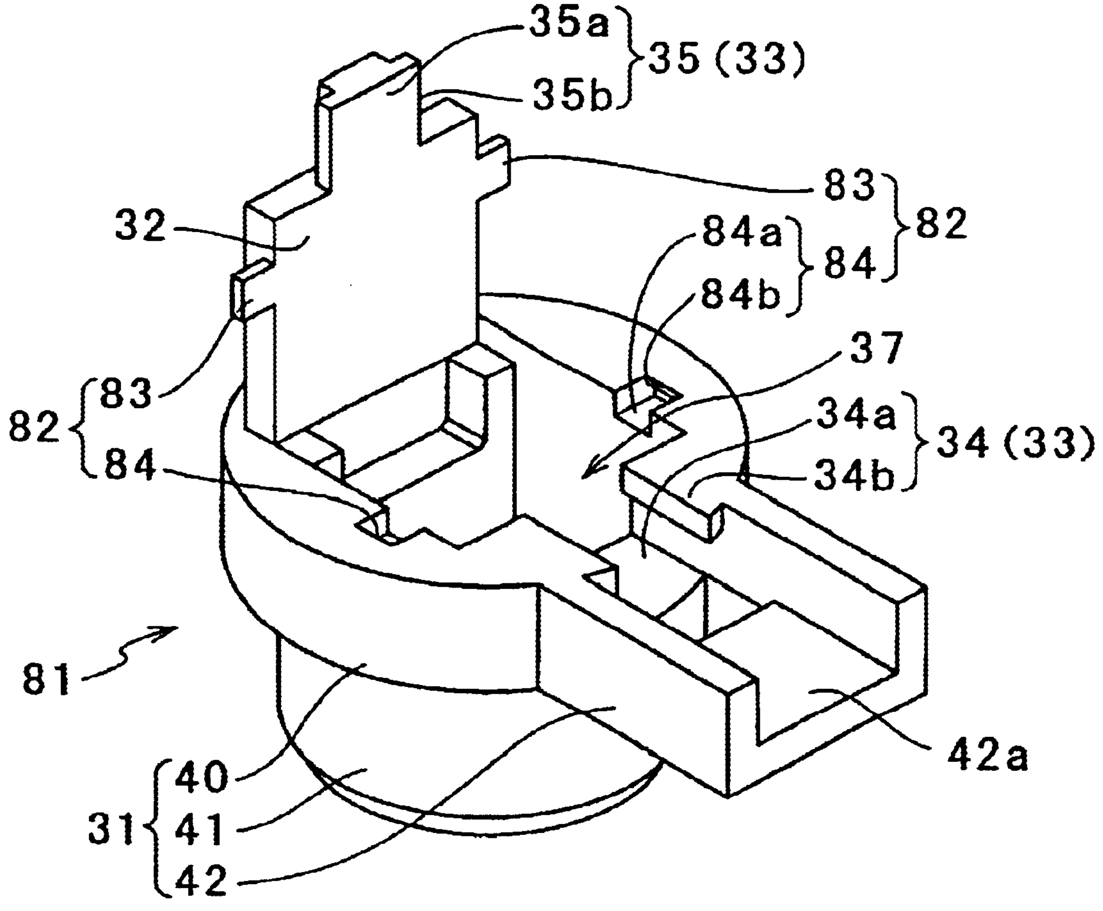
FIG. 8 is a perspective view of a housing.

Further, as shown by FIG. 8, the housing 81 may be provided with a second latching mechanism 82 formed at predetermined portions of the housing main body 31 and the housing lid 32 other than portions formed with the first latching mechanism 33, in order to maintain the contact state of the housing lid 32 and the housing main body 31. That is, the second latching mechanism 82 includes a main body side latching portion 84 provided at the housing main body 31 and a lid side latching portion 83 formed at a side face of the housing lid 32. The main body side latching portion 84 is constituted by a fitting groove 84*a* opened to the contact containing hole 37 and a projected portion 84*b* projected from a wall face on a depth side of the fitting groove 84*a* to an opening side. Meanwhile, each of the respective lid side latching portions 83 is of a width fitted to the fitting groove 84*a* and a front end portion thereof is formed in a shape of a plate having a length to be latched by the projected portion 84*b*. According to the constitution, engagement of the housing lid 32 to the housing main body 31 can further be ensured by the holding force of the second latching mechanism 82.

Further, although as shown by FIG. 2, each of the housings 30, 81 according to the embodiment is constituted to contain the contact 1 arranged with the first positioning portion 3 and the second positioning portion 4 respectively at the front end portion and the rear end portion of the connecting line portion 2, the invention is not limited thereto. That is, as shown by FIGS. 9A through 9C, the housing may be constituted to contain a contact 11 having a contact fixing portion 12 in a flat plate shape at a front end portion thereof.

The above-described contact 11 includes the connecting line portion 2, the contact portions 9, 9 provided at the both end portions in the left and right direction of the connecting line portion 2, the second positioning portion 4 provided at the rear end portion of the connecting line portion 2, the contact fixing portion 12 provided at the front end portion of the connecting line portion 2, and wall portions 13, 13 raised from both end portions in the left and right direction of the contact portions 9. Further, a housing 90 for containing the contact 11 constituted in this way includes the housing main body 31 and the housing lid 32. The housing main body 31 is formed with the first containing portion 37*a* (concave portion) for containing the contact fixing portion 12 constituted by extending a portion of the contact 11. A lower face of the housing lid 32 is formed with a convex portion 14 for pinching the contact fixing portion 12 by being fitted to the first containing portion 37*a*. According to the constitution, since the contact fixing portion 12 is pinched by the first containing portion 37*a* and the convex portion 14, the contact 11 can be fixed in the housing 90 in a stable state.

Incidentally, it is preferable to fit the convex portion 14 to the above-described first containing portion 37*a* by press-fitting. Thereby, the contact fixing portion 12 is pinched by the first containing portion 37*a* and the convex portion 14 by press-fitting and therefore, the contact 11 can be fixed inside the housing 90 in a stable state and solidly.

Figure 9A:
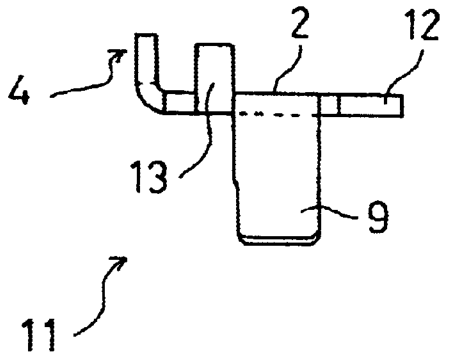
FIGS. 9A, 9B and 9C show a constitution of a contact for a coaxial connector.
Figure 9B:
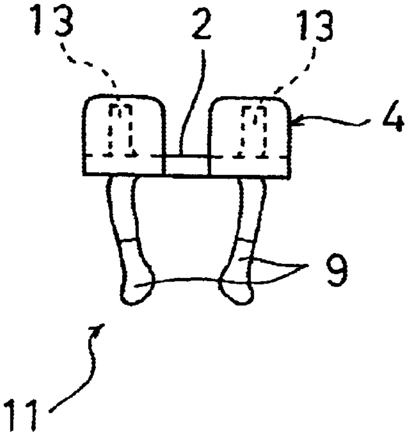
Figure 9C:
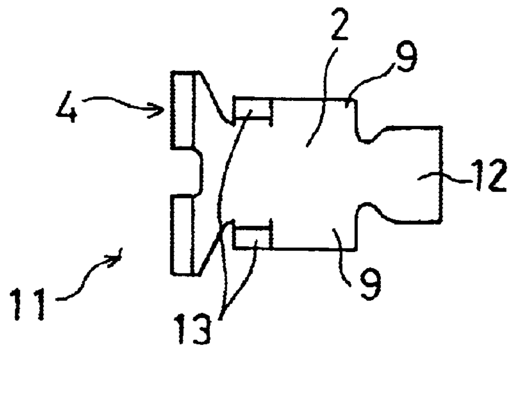
Figure 10B:
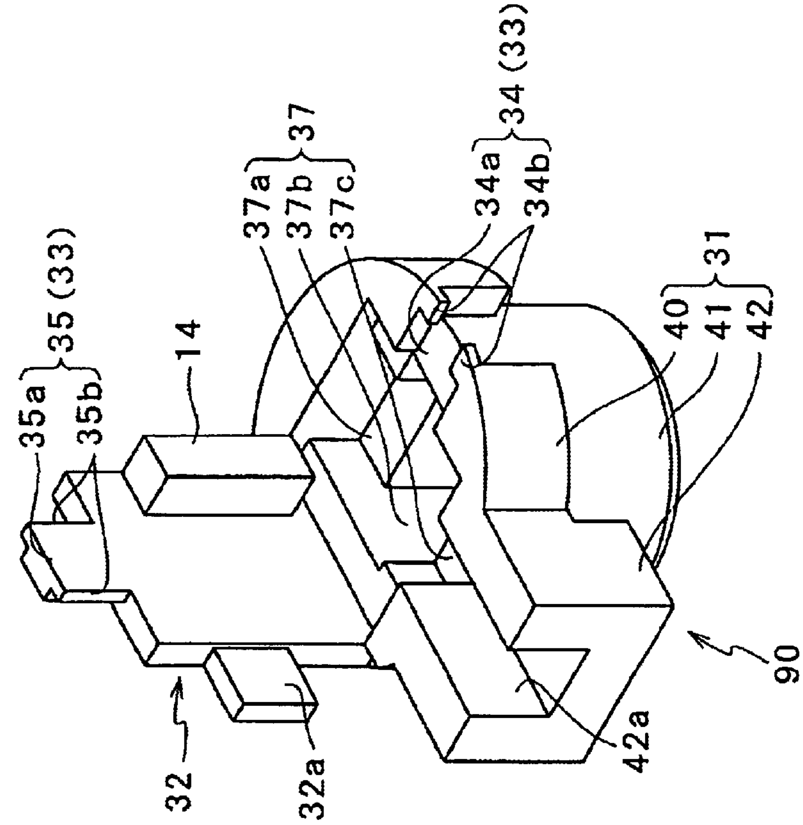
FIGS. 10A and 10B are perspective views of a housing.
Figure 10A:
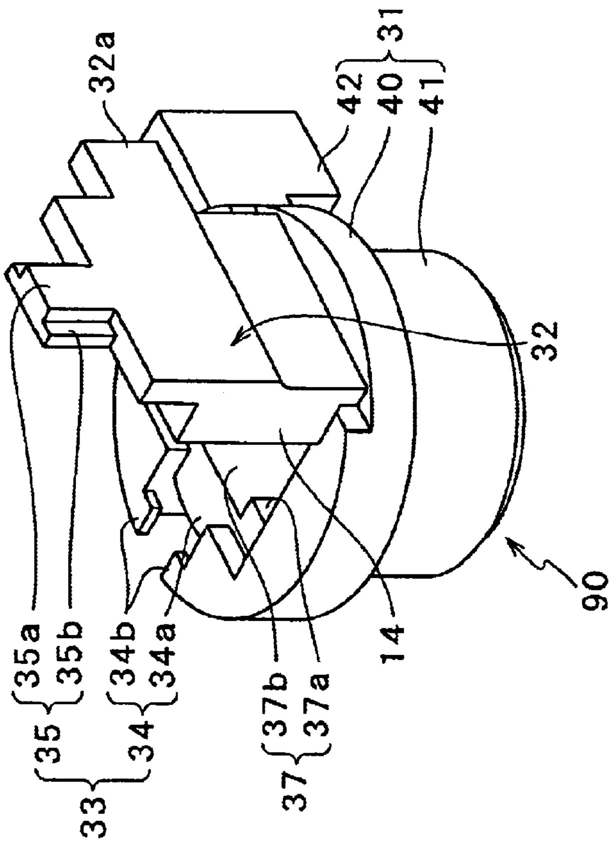
Figure 11:
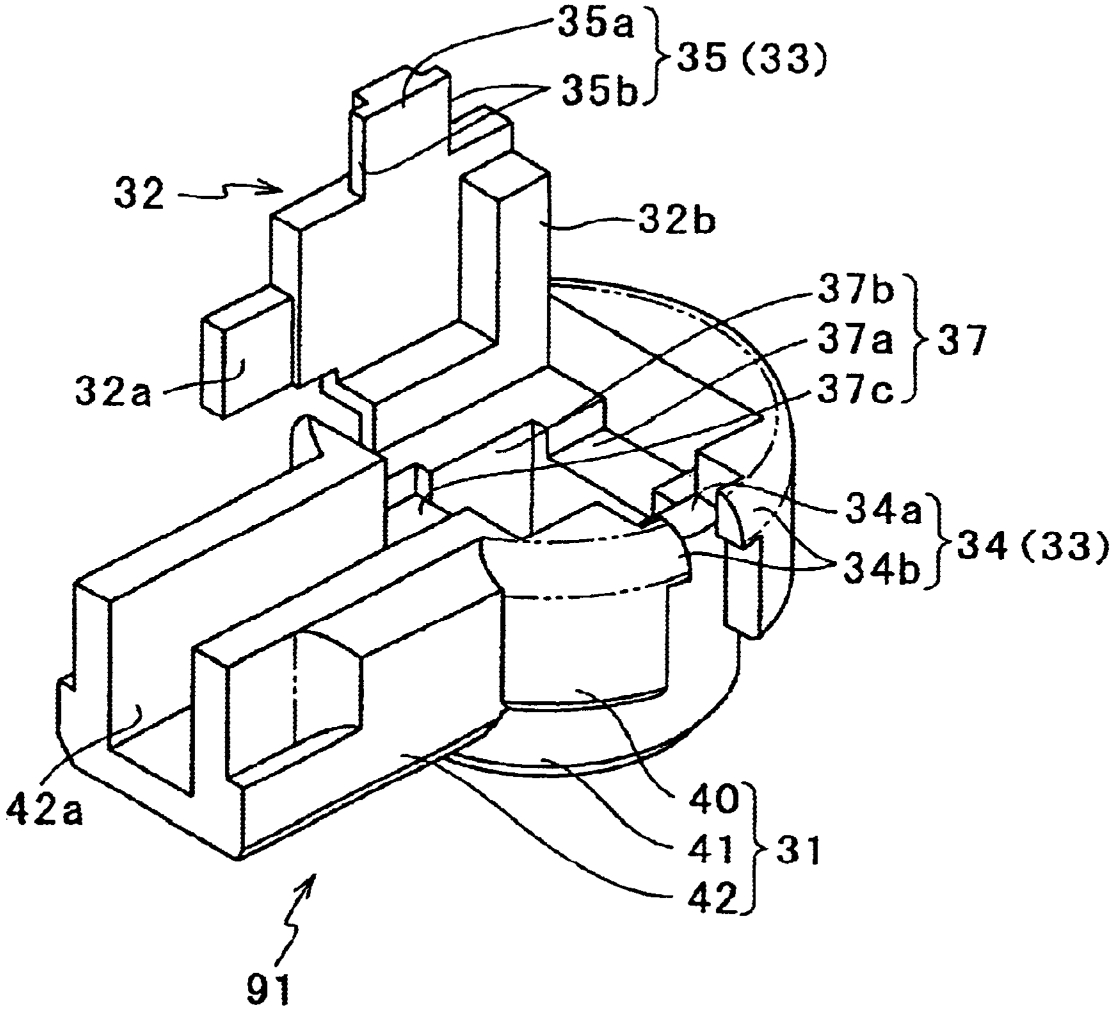
FIG. 11 is a perspective view of a housing.

Further, the contact 11 of FIGS. 9A, 9B and 9C may be contained in the housing 91 shown in FIG. 11. The housing 91 includes the housing main body 31 and the housing lid 32. The housing main body 31 is formed with the first containing portion 37*a* (concave portion) for containing the contact fixing portion 12 constituted by extending a portion of the above-described contact 11 of FIGS. 9A, 9B and 9C. Further, the housing lid 32 is formed in a stepped shape in which a portion thereof is pushed out toward the first containing portion 37*a* to be brought into contact with the contact fixing portion 12 contained in the first containing portion 37*a*. According to the constitution, the contact fixing portion 12 is contained in the first containing portion 37*a* while being brought into contact with a pushed-out portion 32*b* of the housing lid 32 and therefore, the contact 11 can be fixed inside the housing main body 31 in a stable state.

AVAILABILITY ON INDUSTRY

The housing and the coaxial connector having the housing, explained above, can be applied to electronic apparatus or the like of information terminal apparatus, computer related apparatus or the like.

What is claimed is:

1. A housing comprising:

a housing main body for containing a contact connected with a central conductor of a coaxial cable;

a housing lid formed such that one side of an upper edge portion of the housing main body constitutes a fixed end thereof, for covering an upper side of the contact by being bent to fold at the fixed end such that a free end side thereof is brought into contact with other side of the upper edge portion of the housing main body; and a first latching mechanism formed on the other side of the upper edge portion of the housing main body and the free end side of the housing lid for maintaining a state of bringing the housing lid and the housing main body into contact with each other.

2. The housing according to claim 1, characterized in that the housing main body contains the contact such that the free end side of the housing lid covers an upper side of a dielectric portion of the coaxial cable.

3. The housing according to claim 1, further comprising:

a second latching mechanism formed at predetermined portions of the housing main body and the housing lid other than portions thereof formed with the first latching mechanism for maintaining the state of bringing the housing lid and the housing main body into contact with each other.

4. The housing according to claim 2, further comprising:

a second latching mechanism formed at predetermined portions of the housing main body and the housing lid other than portions thereof formed with the first latching mechanism for maintaining the state of bringing the housing lid and the housing main body into contact with each other.

5. The housing according to claim 1, wherein the housing main body contains the contact such that a dielectric portion of the coaxial cable is disposed at a portion thereof deviated from the free end side of the housing lid; and wherein the housing lid is formed with a cover portion to cover an upper side of the dielectric portion of the coaxial cable contained in the housing main body.

6. The housing according to claim 5, further comprising:

a third latching mechanism provided in the cover portion and the housing main body for maintaining a state of covering the upper side of the dielectric portion of the coaxial cable.

7. The housing according to claim 5, further comprising:

a fourth latching mechanism formed at predetermined portions of the housing main body and the housing lid other than portions thereof formed with the first latching mechanism and the cover portion for maintaining the state of bringing the housing lid and the housing main body into contact with each other.

8. The housing according to claim 6, further comprising:

a fourth latching mechanism formed at predetermined portions of the housing main body and the housing lid other than portions thereof formed with the first latching mechanism and the cover portion for maintaining the state of bringing the housing lid and the housing main body into contact with each other.

9. The housing according to claim 1, wherein the housing main body is formed with a concave portion for containing a contact fixing portion constituted by extending a portion of the contact; and wherein the housing lid is formed to be brought into contact with the contact fixing portion contained in the concave portion.

10. The housing according to claim 1, wherein the housing main body is formed with a concave portion for containing a contact fixing portion constituted by extending a portion of the contact; and wherein a lower face of the housing lid is formed with a convex portion for pinching the contact fixing portion by being fitted to the concave portion.

11. The housing according to claim 10, wherein the convex portion of the housing lid is fitted to the concave portion of the housing main body by press-fitting.

12. The housing according to claim 1, wherein when the housing main body is contained at inside of a shell main body with a shell lid erected, a positional relationship in which the housing lid erected from the housing main body and the shell lid do not overlap in an erected state is constituted.

13. A coaxial connector comprising the housing according to claim 1.

* * * * *

UNITED STATES PATENT AND TRADEMARK OFFICE

CERTIFICATE OF CORRECTION

PATENT NO. : 6,670,552 B2
DATED : December 30, 2003
INVENTOR(S) : Keiji Kuroda et al.

It is certified that error appears in the above-identified patent and that said Letters Patent is hereby corrected as shown below:

Title page,
Item [57], ABSTRACT,
Line 9, please replace the word "mechanist" with -- mechanism --.

Signed and Sealed this

Twenty-fourth Day of February, 2004

JON W. DUDAS
*Acting Director of the United States Patent and Trademark Office*